Nov. 18, 1924.  1,516,375
R. E. C. DELEVOYE ET AL
BRAKE ACTUATING MECHANISM
Original Filed Jan. 3. 1923
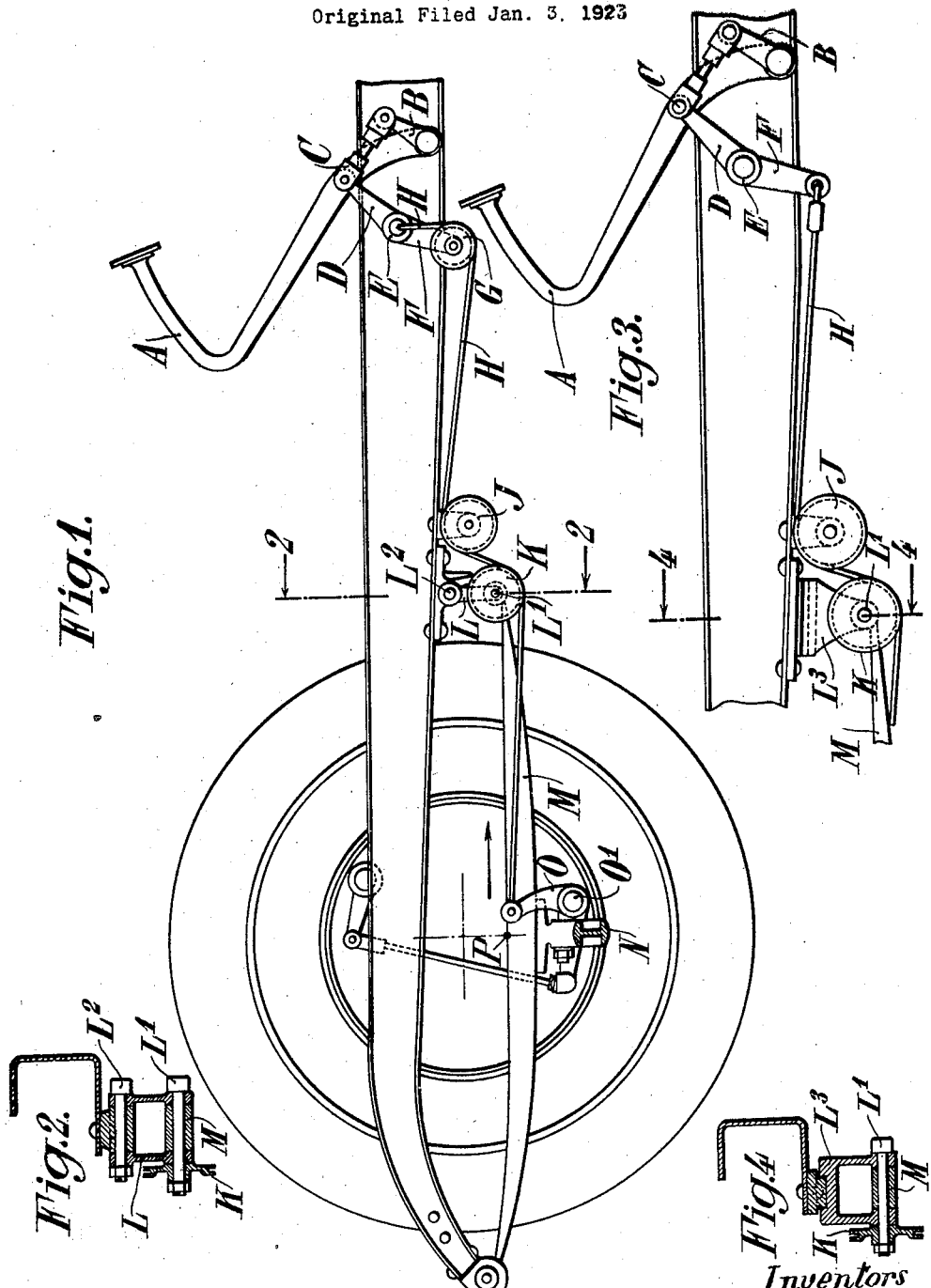
Inventors
R.E.C. Delevoye and
E.A.F. Dumaine
by Wilkinson & Giusta
Attorneys.

Patented Nov. 18, 1924.

1,516,375

UNITED STATES PATENT OFFICE.

ROBERT EMILE CHARLES DELEVOYE, OF PARIS, AND EMILE ALBERT FRANÇOIS DU-MAINE, OF NEUILLY-SUR-SEINE, FRANCE, ASSIGNORS TO SOCIÉTÉ ANONYME DES ANCIENS ETABLISSEMENTS HOTCHKISS & CIE., OF LEVALLOIS-PERRET, SEINE, FRANCE.

BRAKE-ACTUATING MECHANISM.

Original application filed January 3, 1923, Serial No. 610,493. Divided and this application filed December 12, 1923. Serial No. 680,212.

*To all whom it may concern:*

Be it known that we, ROBERT EMILE CHARLES DELEVOYE and EMILE ALBERT FRANÇOIS DUMAINE, engineers, citizens of the Republic of France, residing, respectively, at 6 Rue Cavalotti, Paris, Seine, France, and 59 Boulevard de la Saussaye, Neuilly-sur-Seine, Seine, France, have invented new and useful Improvements in Brake-Actuating Mechanisms, of which the following is a specification.

This application is a division of our application for Letters Patent filed January 3, 1923, Serial No. 610,493.

The present invention relates to a brake-actuating device for the front wheels of automobiles and for other uses, said actuating device being constructed in such a manner as to eliminate the influence of the oscillations of the supporting springs on said actuating device itself, and consequently upon the braking action.

The actuating device according to the invention is characterized by the fact that there is interposed, in the transmission mechanism between the operating member and the braking device proper, a compensating mechanism, the displacement of which, caused by the movements of the free end of the spring, neutralizes the effects of tension and relaxation produced in the transmission mechanism by the oscillations of the spring.

According to the present invention the brake pedal acts upon a cable, connected on each side of the chassis of the vehicle, to a lever which is keyed upon a shaft mounted upon the axle, and actuates the brake situated upon the same side as this lever, this cable passing in opposite directions over two pulleys, one of which is mounted upon the chassis while the other is mounted upon the extremity of the shackle for the spring.

The invention is shown diagrammatically and by way of example in the accompanying drawing in which:

Fig. 1 shows an actuating mechanism for the front brakes of automobiles in which cables are used;

Fig. 2 is a section along line 2—2 of Fig. 1;

Fig. 3 shows an actuating mechanism, similar to that of Fig. 1, but slightly modified;

Fig. 4 is a section along line 4—4 of Fig. 3.

Referring first to Figs. 1 and 2: A shaft E parallel to the axle N and journalled in the chassis of the vehicle is actuated by a pedal A in any suitable manner and, for example, through the intermediary of a lever B keyed upon the same shaft as the pedal A, a lever D keyed upon the shaft E and an adjustable link C connecting the extremities of the levers B and D. The shaft E carries at each extremity a lever F and these two levers F are keyed on this shaft. Each lever F carries a pulley G at its free end.

Since the mechanism to be described below is the same on each side of the chassis, only the mechanism for one side of the chassis will be described.

The shaft E is hollow and a cable H passes longitudinally therethrough and is then led over the pulleys G on each side of the chassis. The cable H then passes in opposite directions over two pulleys J and K; the pulley J is carried by the chassis and the pulley K is mounted upon the shackle L of the spring M. The spring M is mounted in the usual manner in the spring carrier-arm and is fixed to the axle N. The pulley K is preferably mounted concentrically to the axis of the spring $L^1$ which passes through the shackle L. The extremity of the cable H is fixed to the extremity of a lever O keyed upon a rock shaft $O^1$ mounted on the axle N. The shaft $O^1$ actuates the brake situated upon the same side as said shaft by means of a suitable device.

The method of operation is as follows:

When the spring M yields, the axle N and, in consequence, the lever O move a certain distance towards the right in such a manner that the lever O approaches the shaft E, the effect of which would be to relax the cable H if the device according to the invention did not intervene. At the same time as the lever O approaches the shaft E by a certain amount, the pulley K, approaches the pulley J by substantially double this amount (oscillating about the upper point of suspension $L^2$ of the shackle L) the horizontal displacement of the shaft $L^1$ being double that of the centre P of the spring M. This movement of the pulley K increases the arc of contact of the cable H around the pulleys J and K and it will be seen that, by suitably selecting the diameters and the distance apart of the pulleys J and K as well as, eventually, the position of the pulley K on the link L, this increase in the arc of contact of the cable H compensates for the coming together of O and E. The horizontal movements of the lever O will then have no effect upon the tension of the cable H and in consequence they will not affect the braking action and will not react upon the pedal A, which reaction is extremely disagreeable and tiring for the driver.

It is evident that the device also operates when the spring M bends in the opposite direction, that is to say, when the effect of the bending of the spring is to move the lever O away from the shaft E in the direction opposite to that shown by the arrow in Figure 1. In this case, the arc of contact of the cable H upon the pulleys J and K diminishes which fact compensates for the increase of the distance between O and E.

The invention has only been shown and described by way of a purely explanatory example, which is in no way limitative, and it is to be understood that it is applicable to other cases than the one selected by way of example. In a general way it is applicable to the actuation of any organs fixed upon a movable support connected by a leaf spring to a fixed frame which carries the device for actuating said organs.

Furthermore, the details of the actuating mechanism described, could be modified according to practical requirements without departing from the spirit of the invention. For instance, the cable H could be fixed to the levers F, and the oscillating link L of the spring M could be replaced by a slide having a rectilinear movement with respect to the chassis as shown in Figs. 3 and 4.

We claim:

1. A brake actuating mechanism comprising in combination; with a chassis: a suspension spring for an axle, a movable support for the free end of said spring, a brake pedal mounted on said chassis, a brake-mechanism for wheels mounted on said axle, cables connecting said brake-pedal to said brake-mechanism, a pulley carried by said movable support, a second pulley mounted on the chassis adjacent said first pulley, said cable being led over said pulleys in opposite directions and said pulleys being so located that the movements of the spring alter the arc of contact of the cable with said pulleys.

2. A brake actuating mechanism comprising in combination with a chassis: a suspension spring for an axle, a movable support for the free end of said spring, a brake pedal mounted on said chassis, a brake mechanism for wheels mounted on said axle, cables connecting said brake-pedal to said brake-mechanism and means rotatably connected to said movable support, at the point of connection thereof with the free end of the spring, for nullifying the effect of the oscillations of said spring upon said cables.

3. A brake-actuating mechanism, comprising in combination a suspension spring for an axle, a brake pedal, a cable connected to said brake pedal, a brake operating lever mounted on the axle, the end of said cable being connected to said lever, a pulley carried by the free end of said spring, a second pulley mounted on the chassis, said cable being led over said pulleys in opposite directions.

4. A brake-actuating mechanism, comprising in combination a suspension spring for an axle, a brake-pedal, a brake-operating lever mounted on the axle, a cable connecting said pedal to said brake operating lever, a pulley connected to the free end of said spring, a second pulley mounted on the chassis, said cable passing over said pulleys in opposite directions and said pulleys being located so that the movements of the spring alter the arc of contact of the cable with the pulleys.

5. A brake-actuating mechanism comprising in combination with a chassis: a suspension spring for an axle, a movable support for the free end of said spring, a brake pedal mounted on said chassis, a brake mechanism for wheels mounted on said axle, cables connecting said brake-pedal to said brake mechanism, a pulley carried by the free end of said spring, a second pulley mounted on the chassis, said cable being led over said pulleys in opposite directions.

6. A brake-actuating mechanism comprising in combination with a chassis: a suspension spring for an axle, a movable support for the free end of said spring, a brake pedal mounted on said chassis, a brake mechanism for wheels mounted on said axle, cables connecting said brake-pedal to said brake mechanism, a pulley carried by the free end of said spring, a second pulley mounted on the chassis, said cable being led over said pulleys in opposite directions and said pulleys being located so that the movements of the spring alter the arc of contact of the cable with the pulleys.

7. A brake-actuating mechanism comprising in combination suspension springs, a brake-pedal, a hollow shaft actuated by said brake-pedal, a brake-operating lever on each side of the automobile, a cable passing through said hollow shaft and having each end connected to one of said brake operating levers, a pulley carried by the free end of each of said springs, a second pulley mounted on the chassis adjacent each of said first pulleys, said cable passing in opposite directions over said pulleys.

ROBERT EMILE CHARLES DELEVOYE.
EMILE ALBERT FRANÇOIS DUMAINE.